(12) United States Patent
Pandolfi

(10) Patent No.: US 11,536,038 B2
(45) Date of Patent: Dec. 27, 2022

(54) METHOD AND SYSTEM FOR AUTOMATICALLY LEVELLING DROPPED CEILINGS, FLOATING FLOORS, PIPES OR CABLE TRAYS

(71) Applicant: AKIFIX S.P.A. CON SOCIO UNICO, Bolzano (IT)

(72) Inventor: Giovanni Pandolfi, Bolzano (IT)

(73) Assignee: AKIFIX S.P.A. CON SOCIO UNICO, Bolzano (IT)

( * ) Notice: Subject to any disclaimer, the term of this patent is extended or adjusted under 35 U.S.C. 154(b) by 129 days.

(21) Appl. No.: 17/058,466

(22) PCT Filed: May 31, 2019

(86) PCT No.: PCT/IB2019/054541
§ 371 (c)(1),
(2) Date: Nov. 24, 2020

(87) PCT Pub. No.: WO2019/229716
PCT Pub. Date: Dec. 5, 2019

(65) Prior Publication Data
US 2021/0198905 A1    Jul. 1, 2021

(30) Foreign Application Priority Data
Jun. 1, 2018 (IT) .......................... 102018000005946

(51) Int. Cl.
*E04F 21/18* (2006.01)
*B25B 21/00* (2006.01)
(Continued)

(52) U.S. Cl.
CPC ........ *E04F 21/1805* (2013.01); *B25B 21/002* (2013.01); *E04B 9/20* (2013.01);
(Continued)

(58) Field of Classification Search
CPC .. B25B 21/002; B25F 5/00; E04B 9/20; E04F 21/1805; E04F 21/20; G01C 15/006
See application file for complete search history.

(56) References Cited

U.S. PATENT DOCUMENTS 3,767,008 A * 10/1973 LeBlanc ............. E04F 21/1805
                                                    52/745.05
4,674,870 A *  6/1987 Cain  .................... G01C 15/004
                                                       356/400
(Continued)

FOREIGN PATENT DOCUMENTS

DE    10 2009 054712    6/2011

*Primary Examiner* — James M Ference
(74) *Attorney, Agent, or Firm* — Leason Ellis LLP

(57) ABSTRACT

A method for levelling an anchoring system for a dropped ceiling, a floating floor, a pipe or a cable tray, having at least one support bracket for the pipe or a section bar of a support frame of a dropped ceiling, a floating floor or a cable tray, and an adjustment screw to adjust the distance of the section bar from a reference surface, wherein a laser receiver is placed in contact with the section bar or the support bracket, has an optical window to receive a laser beam emitted by a laser level, assumes two height states indicating the receiving position of the laser beam relative to a reference position, and transmits, in a wireless manner, two control signals corresponding to the two height states, and wherein an electric screwdriver receives, in a wireless manner, the control signals and switches the rotation of the adjustment screw between one direction and the opposite direction based on the control signal received.

8 Claims, 4 Drawing Sheets

(51) Int. Cl.
*E04B 9/20* (2006.01)
*E04F 15/024* (2006.01)
*E04F 21/20* (2006.01)
*G01C 15/00* (2006.01)

(52) U.S. Cl.
CPC .......... *E04F 15/0247* (2013.01); *E04F 21/20* (2013.01); *G01C 15/006* (2013.01)

(56) References Cited

U.S. PATENT DOCUMENTS

| | | | | |
|---|---|---|---|---|
| 5,446,968 | A * | 9/1995 | Okaniwa | E04F 15/024 33/366.26 |
| 5,484,026 | A * | 1/1996 | Susaki | E04F 15/024 173/4 |
| 10,488,197 | B2 * | 11/2019 | Finkelstein | G01C 15/004 |
| 2011/0284254 | A1 * | 11/2011 | Moore | B25F 5/00 173/2 |
| 2017/0122735 | A1 * | 5/2017 | Finkelstein | E04F 21/22 |
| 2021/0198905 | A1 * | 7/2021 | Pandolfi | B25B 21/002 |

* cited by examiner

METHOD AND SYSTEM FOR AUTOMATICALLY LEVELLING DROPPED CEILINGS, FLOATING FLOORS, PIPES OR CABLE TRAYS

CROSS-REFERENCE TO RELATED APPLICATIONS

This patent application is a U.S. National Phase Application under 35 U.S.C. § 371 of International Patent Application No. PCT/IB2019/054541, filed on May 31, 2019, which claims priority from Italian patent application no. 102018000005946 filed on Jun. 1, 2018, all of which are incorporated by reference, as if expressly set forth in their respective entireties herein.

TECHNICAL FIELD

The invention relates to a method for automatically levelling dropped ceilings, floating floors, pipes or cable trays and to a corresponding automatic levelling system.

In particular, the invention finds advantageous, though non-exclusive, application in the automatic levelling of dropped ceilings, to which explicit reference will be made in the description below without because of this losing in generality.

BACKGROUND ART

In the building field, an anchoring system is known, which is used to connect a plasterboard dropped ceiling to a ceiling of a building so as to create a hollow space for the passage of a plurality of cables of different types.

The anchoring system comprises a plurality of threaded rods, which are substantially parallel to one another, are coupled to the ceiling and project downwards from the ceiling.

The anchoring system further comprises, for each threaded rod, a respective anchoring device, which is defined, in particular, by a support bracket, which is screwed to a free lower end of the threaded rod and carries, connected to it, a section bar defining part of a support frame for a dropped ceiling.

The correct position of each section bar relative to the ceiling, namely the correct levelling of the dropped ceiling, is controlled by means of a laser level cooperating with a receiver, which is placed in contact with the section bar and receives the laser beam emitted by the laser level.

Known anchoring devices of the type described above are affected by some drawbacks, which are mainly due to the fact that, when the receiver signals the wrong position of a section bar relative to the ceiling of the building, operators must remove the section bar from the support bracket, rotate the support bracket on the threaded rod, couple the section bar again to the support bracket and control again the position of the section bar by means of the laser level and the receiver.

In other words, the levelling of the plasterboard dropped ceiling relative to the ceiling of the building implies, for the operators involved in the installation of the dropped ceiling, a relatively long, complicated and expensive operating sequence.

DISCLOSURE OF INVENTION

The object of the invention is to provide a levelling system for an anchoring system for dropped ceilings, which is not affected by the aforementioned drawbacks and can be implemented in a simple and economic fashion.

According to the invention, there are provided a method for levelling an anchoring system for dropped ceilings, floating floors, pipes or cable trays and a levelling system as set forth in the appended claims.

BRIEF DESCRIPTION OF THE DRAWINGS

The invention will now be described with reference to the accompanying drawings, which show a non-limiting embodiment thereof, wherein.

BEST MODE FOR CARRYING OUT THE INVENTION

Figure 1:
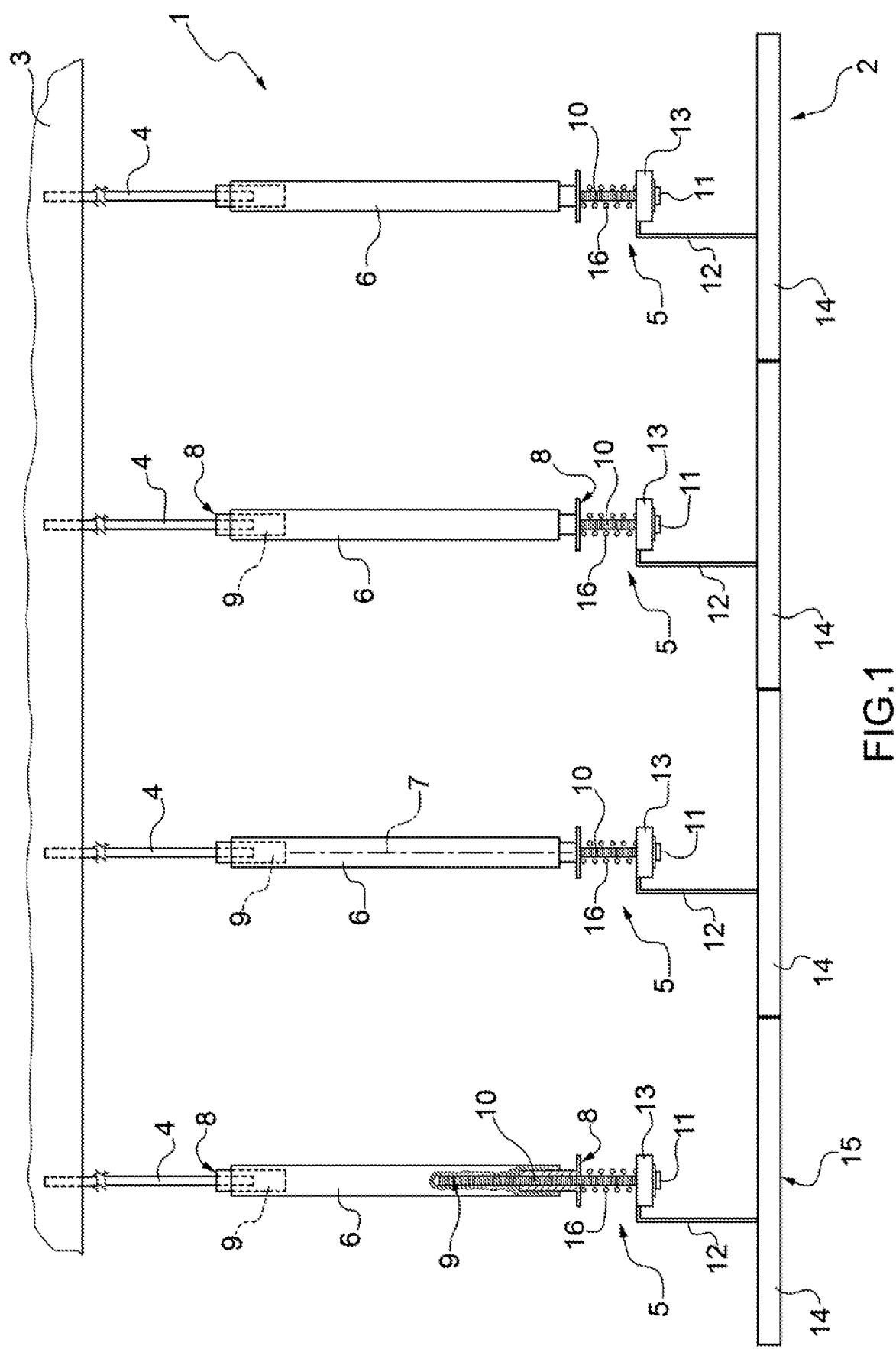
FIG. 1 is a schematic side view of an anchoring system to fix a dropped ceiling to a ceiling.

In FIG. 1, number 1 generically indicates, as a whole, an anchoring system to anchor a dropped ceiling 2, in particular made of plasterboard, to a ceiling 3 of a building. The anchoring system 1 comprises a plurality of hooking rods 4, which are parallel to one another, are coupled to the ceiling 3 in a known manner and project downwards from the ceiling 3.

The anchoring system 1 further comprises, for each hooking rod 4, a respective anchoring device 5 comprising, in turn, a coupling bar 6, which has a longitudinal axis 7 and is axially delimited by two end faces 8, which are substantially perpendicular to the axis 7.

Figure 2:
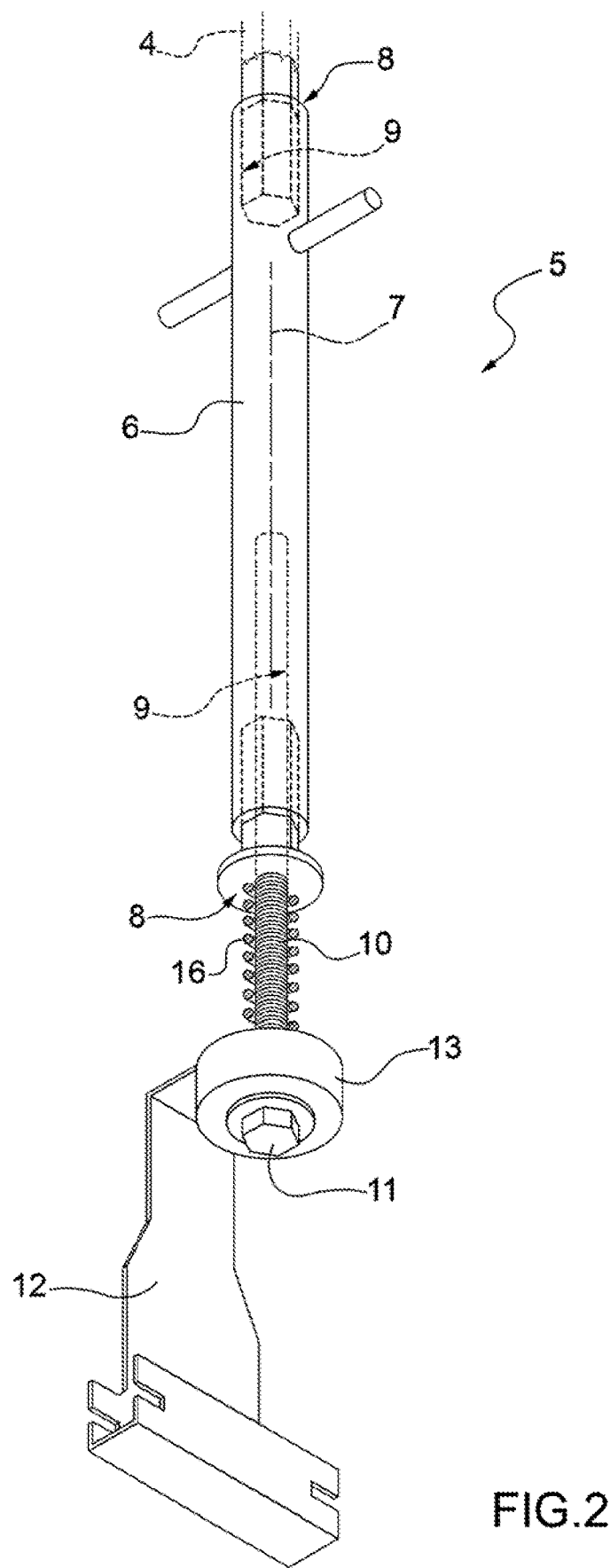
FIG. 2 is a schematic perspective view of an anchoring device of the anchoring system of FIG. 1.

With reference to FIGS. 1 and 2, the coupling bar 6 has two threaded cavities 9, each opening up outwards in the area of a relative face 8.

One of the cavities 9 is screwed on a lower threaded end of the hooking rod 4, whereas in the other cavity 9 there is screwed an adjustment screw 10 provided with a hexagonal maneuvering head 11.

The anchoring device 5 further comprises a support bracket 12, which is provided with an end sleeve 13 coupled in a rotary and axially sliding manner to the adjustment screw 10, projects downwards from the sleeve 13 and carries, hooked to it, a section bar 14 of a support frame 15 of the dropped ceiling 2.

The maneuvering head 11 defines a lower limit stop element designed to axially stop the sleeve 13 and, hence, the support bracket 12, which is coupled to the coupling bar 6 through the interposition of a shock-absorber spring 16.

Figure 3:
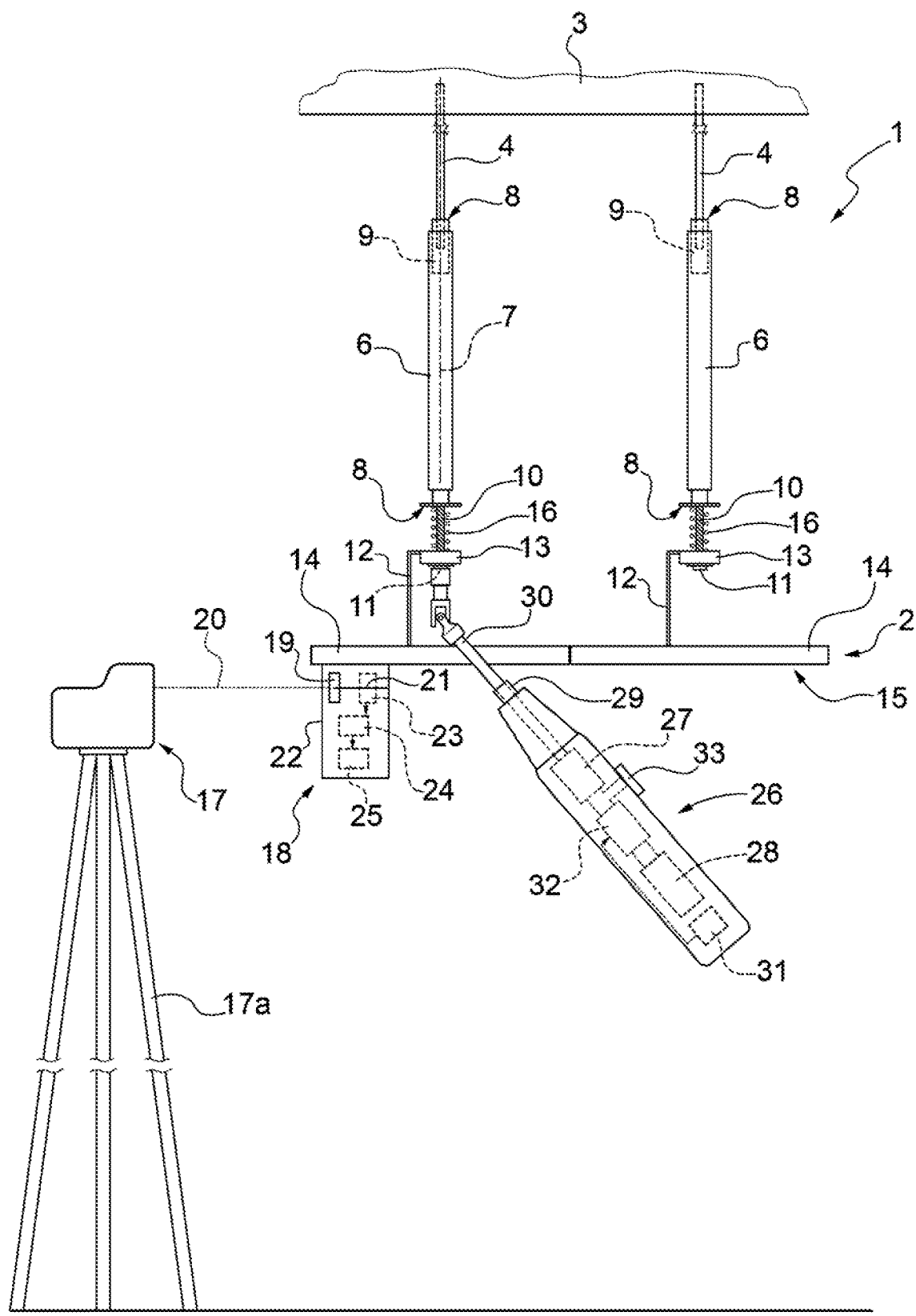
FIG. 3 shows the levelling system according to the invention and, in particular, designed to carry out the method according to the invention for levelling the anchoring system for dropped ceilings of FIG. 1.

In FIG. 3, number 17 indicates a known laser level, for instance a laser level with a rotary beam, in particular supported by a tripod 17a, and number 18 indicates a laser receiver cooperating with the laser level 17 in order to control the correct position of each section bar 14 relative to the ceiling 3, namely the correct levelling of the dropped ceiling 2. Alternatively, the laser level 17 is a laser level with a fixed beam.

The laser receiver 18 comprises an optical window 19 designed to receive a laser beam 20 emitted by the laser level 17 and a reference position 21 printed on a face of the outer shell 22 of the laser receiver 18 and correlated with dimensions and position of the optical window 19. In use, according to FIG. 3, the laser receiver 18 is placed in contact with the section bar 14 and the laser level 17 is placed so as to project the laser beam 20 towards the optical window 19 at a given height correlated with a desired distance between the ceiling 3 and the dropped ceiling 2.

The laser receiver 18 comprises an electronic module 23 configured in a known manner so as to assume at least two height states indicating, a first one, that the receiving position of the laser beam 20 is higher than the reference position 21 ("too high" state) and, a second one, that the receiving position of the laser beam 20 is lower than the reference position 21 ("too low" state). Furthermore, the electronic module 23 is configured in a known manner so as to also assume a third height state indicating that the receiving position of the laser beam 20 is correct, namely that it coincides with the reference position 21 within a predetermined margin of error ("correct level").

The laser receiver 18 typically comprises a known display, which is not shown herein, to display in which one of the three height states the laser receiver 18 is.

The laser receiver 18 further comprises an interface module 24 to transform at least the first height state ("too high") and the second height state ("too low") into two respective control signals, and a wireless transmitter module 25 to transmit the two control signals. The interface module 24 and the wireless transmitter module 25 operate in real time.

With reference to FIG. 3, again, an electric screwdriver 26 is used, in use, by an operator installing the dropped ceiling 2 in order to rotate the adjustment screw 10 around the axis 7, so as to axially lift or lower the sleeve 13, the support bracket 12 and, hence, the section bar 14.

The electric screwdriver 26 comprises a known DC electric motor 27, a battery 28 to apply a supply voltage to the motor 27 and a rotary head 29, which is caused to move by the motor 27. The electric screwdriver 26 is advantageously provided with an articulated coupling arm 30, for instance of the type comprising a universal joint, so as to couple the rotary head 29 to the maneuvering head 11 of the adjustment screw 10.

The electric screwdriver 26 further comprises a wireless receiver module 31 to receive in real time the two control signals and a switching module 32 configured to switch the rotation of the motor 27 between one direction and the opposite direction based on which one of the two control signals is received by the wireless receiver module 31.

In particular, the switching module 32 comprises at least two diverter relays (not shown), which are configured to switch the direction in which the supply voltage is applied to the motor 27 based on which one of the two control signals is received.

The electric screwdriver 26 comprises a single activation button 33 to activate the rotation of the motor 27. In particular, the activation button 33 is connected in series to the motor 27.

The wireless transmitter module 25 and the wireless receiver module 26 advantageously are both radio modules and operate in an ISM frequency band, preferably below 1 GHz, for instance the 433 MHz band.

The wireless transmitter module 25 and the wireless receiver module 26 advantageously have both two channels, a first channel being associated with a first control signal and the second channel being assigned to the second control signal.

The wireless transmitter module 25 advantageously comprises an encoder, for instance a PT2260 encoder, and the wireless receiver module 26 advantageously comprises a decoder, for instance a PT2260 decoder.

In use, the operator places the laser receiver 18 in contact with the section bar 14, in a point possibly close to the support bracket 12 whose height needs to be adjusted, places the laser level 17 so as to project the laser beam 20 towards the optical window 19 at a given distance from the ceiling 3 correlated with a desired distance between the ceiling 3 and the dropped ceiling 2, couples the screwdriver 26 to the adjustment screw 10 through the coupling arm 30 and presses the activation button 33.

When the laser receiver 18 signals a wrong distance of the section bar 14 from the ceiling 3, the screwdriver 26 reacts in real time by adjusting the adjustment screw 10 so as to axially lift or lower the sleeve 13, the support bracket 12 and, hence, the section bar 14. When, on the other hand, the laser receiver 18 signals the right distance of the section bar 14 from the ceiling 3, the screwdriver 26 stops.

In particular, if the laser receiver 18 is in the "too high" state, the screwdriver 26 rotates the adjustment screw so as to lower the sleeve 13. On the contrary, if the laser receiver 18 is in the "too low" state, the screwdriver 26 rotates the adjustment screw so as to lift the sleeve 13. On the other hand, if the laser receiver 18 is in the "correct level" state, it does not transmit any control signal and, therefore, the screwdriver 26 stops. At this point, the operator can release the activation button 33.

Figure 4:
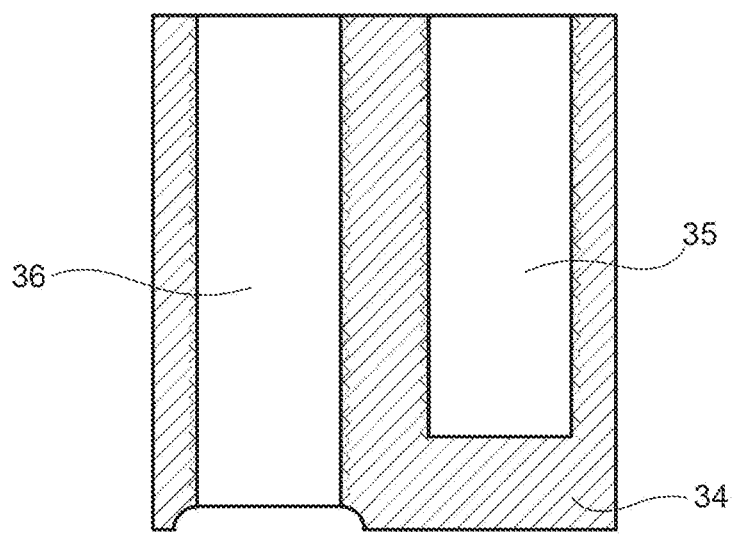
FIG. 4 is a cross-section view of a further embodiment of a detail of the anchoring device of FIG. 2.

According to a further embodiment of the invention, the anchoring device 5 differs from the one shown in FIG. 2 because of the fact that it comprises a coupling block, which is shown and indicated with 34 in FIG. 4, instead of the coupling bar 6. The coupling block 34 has two threaded cavities 35 and 36. In particular, the two cavities 35 and 36 are offset relative to one another. The cavity 35 is a blind cavity and the cavity 36 is a through cavity. In the cavity 35 there is screwed a lower threaded end of the hooking rod 4 and in the cavity 36 there is screwed the adjustment screw 10.

Hence, the laser receiver 18 and the screwdriver 26 form a levelling system which, in cooperation with any laser level 7 compatible with the laser receiver 18, enables the implementation of a method for automatically levelling the anchoring system 1 and, therefore, the section bars 4 of the support frame 15 of the dropped ceiling 2 with only a few operations to be carried out by the installing operator.

According to further embodiments of the invention which are not shown herein, the method is used to automatically level an anchoring system for floating floors, pipes or cable trays.

In case of floating floors, the anchoring system has support brackets resting on a foundation by means of respective feet so as to bear the section bars of a support frame of a floating floor at a given distance from the foundation. The tiles of the floating floor to be levelled are laid on said section bars. The adjustment screw of each support bracket allows for an adjustment of the distance of the section bars from the foundation. Therefore, the foundation is the reference surface used to adjust the distance of the floating floor. The adjustment screw is built-in in the respective foot or is a screw arranged between the support bracket and the support frame.

In case of pipes, for example pipes of a water distribution system in a living or industrial building, the anchoring system comprises support brackets to directly bear the pipes at a given distance from a reference surface consisting, for instance, of the ceiling or the floor of the room where the pipes to be levelled are placed and, for each support bracket, a respective adjustment screw to adjust the distance of the support bracket from the reference surface. In use, the laser receiver 18 is placed directly in contact with each one of the support brackets.

In case of cable trays, the anchoring system comprises support brackets to bear the section bars of a support frame of the trays at a given distance from a reference surface consisting, for instance, of the ceiling or the floor of the room where the trays to be levelled are placed and, for each support bracket, a respective adjustment screw to adjust the distance of the section bars from the reference surface. The cables are laid along said section bars of the support frame.

Even though the invention described above relates to a specific embodiment, it should not be considered as limited to said embodiment, for its scope of protection also includes all those variants, changes or simplifications covered by the appended claims, such as for example a simplified anchoring device 5, which, anyway, comprises a support bracket for a section bar and an adjustment screw to adjust the height of the bracket.

The invention claimed is:

1. A levelling system for leveling an anchoring system for a dropped ceiling, the levelling system comprising: a laser receiver (18), which comprises an outer shell with a top surface for placement against a support frame of the anchoring system and an optical window (19) along one side of the outer shell to receive a laser beam (20) emitted by a laser level (17) that is separate and spaced from the laser receiver (18), the laser receiver (18) having a reference position (21) and being configured to assume at least two height states indicating that a receiving position of the laser beam (20) is higher and lower, respectively, than the reference position (21) of the laser receiver (18) for guiding adjustment of the support frame, the laser receiver (18) comprising interface means (24) to turn the at least two height states into two respective control signals and wireless transmitter means (25) to transmit the two control signals; and an electric screwdriver (26) that is separate and spaced apart from each of the laser receiver and the laser level to allow independent placement and movement of the electric screwdriver relative to both the later level (17) and the laser receiver (18), the electric screwdriver being configured to rotate an adjustment screw (10) that is part of the anchoring system for adjusting a position of the support frame, the electric screwdriver comprising a wireless receiver means (31) to receive the two control signals from the laser receiver (18) and switching means (32), which are configured to switch a rotation of the electric screwdriver between one direction and the opposite direction based on which one of the two control signals is received.

2. The levelling system according to claim 1, wherein said electric screwdriver (26) comprises a motor (27), a rotary head (29) moved by the motor (27) and a single activation button (33) to activate the rotation of the motor (27).

3. The levelling system according to claim 2, wherein said activation button (33) is connected in series to the motor (27).

4. The levelling system according to claim 1, wherein said wireless transmitter and receiver means (25, 31) are radio transmitter and receiver means.

5. The levelling system according to claim 1, wherein said wireless transmitter and receiver means (25, 31) have two channels, each associated with a respective signal of said two control signals.

6. The levelling system according to claim 1, wherein said wireless transmitter means (25) comprise an encoder and said wireless receiver means (31) comprise a decoder.

7. The levelling system according to claim 1, wherein said electric screwdriver (26) comprises a DC motor (27) and a battery to apply a supply voltage to the motor (27); said switching means (32) comprise at least two diverter relays, which are configured to switch the direction in which said supply voltage is applied based on which one of the two control signals is received.

8. A method for levelling an anchoring system for dropped ceilings, floating floors, pipes or cable trays, the anchoring system (1) comprising at least one support bracket (12), which is designed to support, at a distance from a reference surface (3), a pipe or a section bar (14) of a support frame (15) of a dropped ceiling (2), a floating floor or a cable tray, and a respective adjustment screw (10) to adjust said distance, the method comprising:
  placing a laser receiver (18) in contact with said section bar (14) or said support bracket (12) so that an optical window (19) of the laser receiver (18) receives a laser beam of a laser level (17);
  the laser receiver (18) comprising at least two height states indicating that a receiving position of the laser beam (20) is higher and lower, respectively, than a reference position (21) on the laser receiver (18);
  transforming the at least two height states into two respective control signals by means of interface means (24) of the laser receiver (18);
  transmitting the two control signals by means of wireless transmitter means (25) of the laser receiver (18);
  receiving the control signals by means of wireless receiver means (31) of an electric screwdriver (26) designed to rotate the adjustment screw (10); and
  switching a rotation of the adjustment screw (10) between one direction and the opposite direction based on which one of the two control signals is received by means of switching means (32) of the electric screwdriver (26).

* * * * *